Dec. 13, 1932.     N. M. ERDAHL     1,890,975
TIE MEMBER LINKAGE FOR CRAWLER TRACTORS
Filed July 16, 1930     3 Sheets-Sheet 1

Inventor
Nicholai M. Erdahl
by his Attorneys

Witness

Dec. 13, 1932.     N. M. ERDAHL     1,890,975
TIE MEMBER LINKAGE FOR CRAWLER TRACTORS
Filed July 16, 1930     3 Sheets-Sheet 2
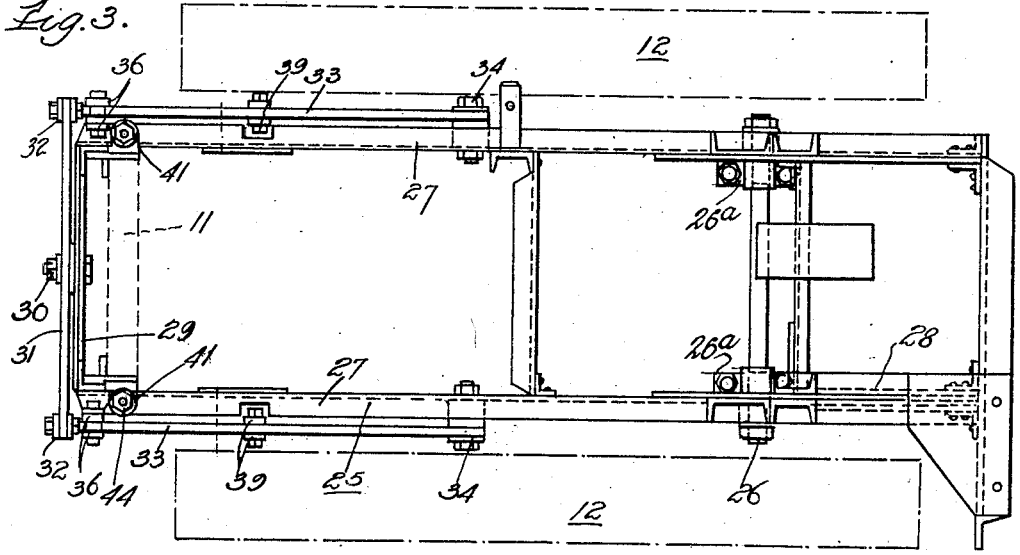
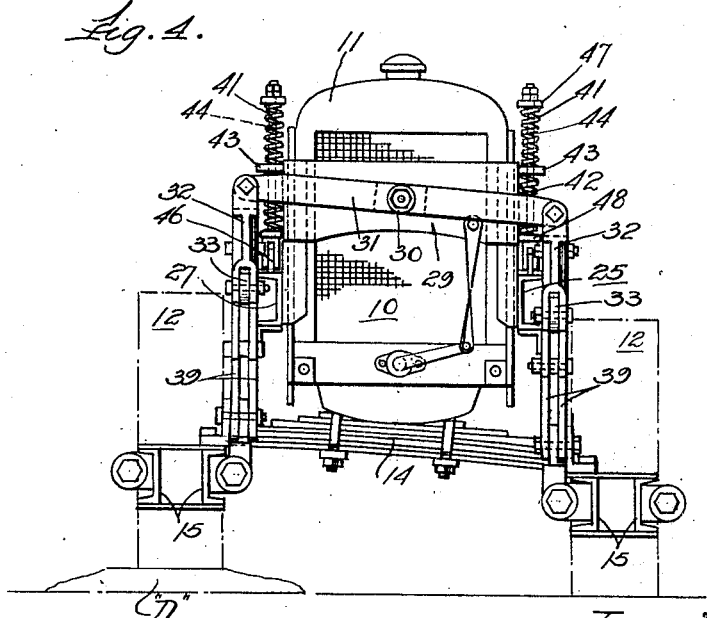
Witness
N. F. McKnight
Inventor
Nicholai M. Erdahl
by Bunton & Bunton
his Attorneys.

Dec. 13, 1932.   N. M. ERDAHL   1,890,975
TIE MEMBER LINKAGE FOR CRAWLER TRACTORS
Filed July 16, 1930   3 Sheets-Sheet 3
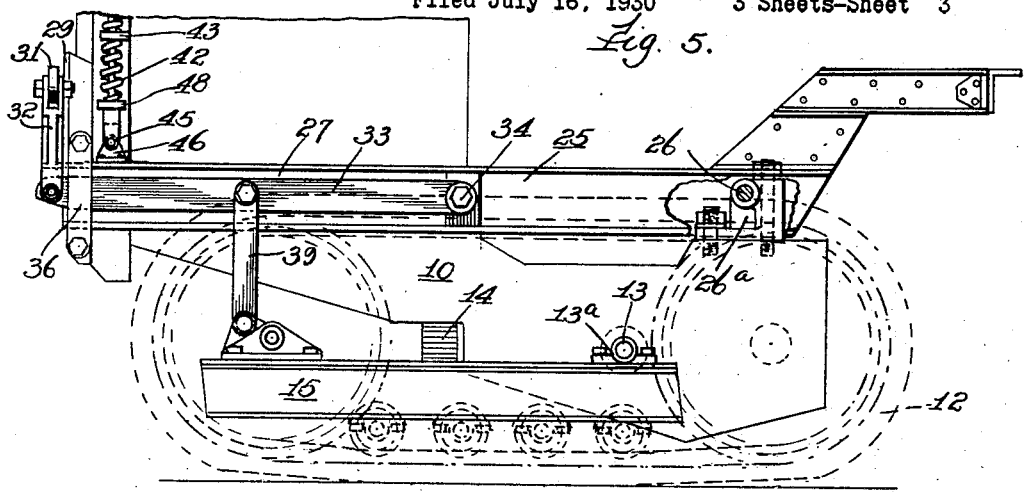
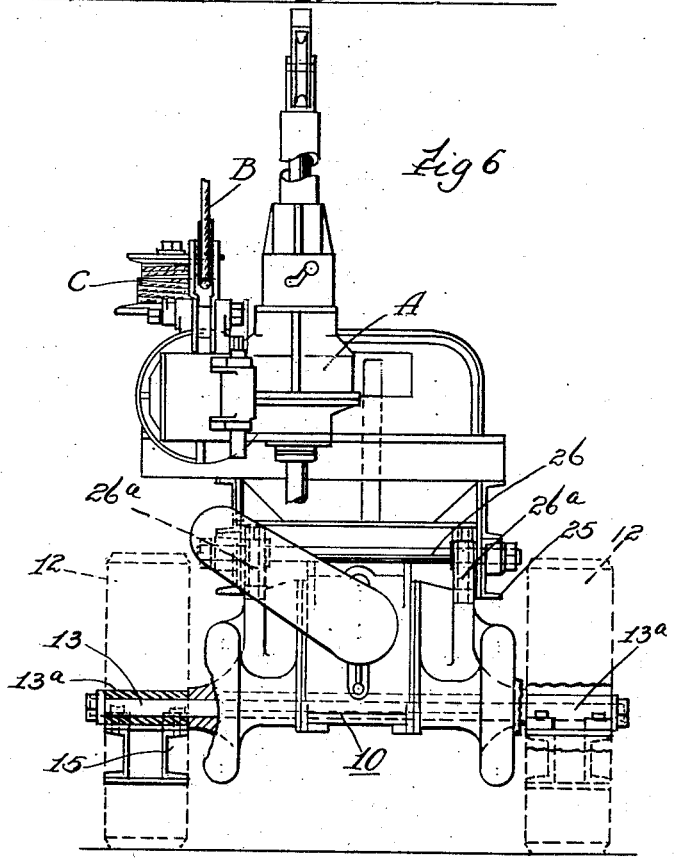
Witness
H. C. McKnight
Inventor:
Nicholai M. Erdahl.
by Barton & Barton
his Attorneys Patented Dec. 13, 1932

1,890,975

UNITED STATES PATENT OFFICE

NICHOLAI M. ERDAHL, OF EDGERTON, WISCONSIN, ASSIGNOR TO HIGHWAY TRAILER COMPANY, OF EDGERTON, WISCONSIN, A CORPORATION OF WISCONSIN

TIE-MEMBER LINKAGE FOR CRAWLER TRACTORS

Application filed July 16, 1930. Serial No. 468,333.

The present invention has reference to vehicles of the tractor type, including a pair of transversely spaced crawler units which are pivotally connected, preferably adjacent one end, to the vehicle chassis. The purpose of this invention is to provide means for positively connecting the opposite or floating ends of the crawler units to the vehicle chassis, and arranged to permit a limited amount of vertical movement of either of the crawler units relative to the vehicle chassis, while at the same time permitting utilization of the weight of the crawler units as ballast, for counteracting forces acting in the direction to tilt the forward end of the vehicle chassis in an upward direction about its pivot connection to the crawler units. It consists in certain features and elements of construction in combination, as herein shown and described, as indicated by the claims.

In the drawings:

Figure 3 is a plan view of the supporting or supplementary frame, with the crawler units indicated in dotted outline.

Figure 4 is a view similar to Figure 2, showing one of the crawler units traversing a rise in the road bed; and showing the mechanism in a corresponding position for accommodating the same.

Figure 5 is a more or less diagrammatic view in side elevation with parts of the chassis omitted.

Figure 6 is a rear end elevation of the vehicle with parts broken away to show details of construction.

Figure 1:
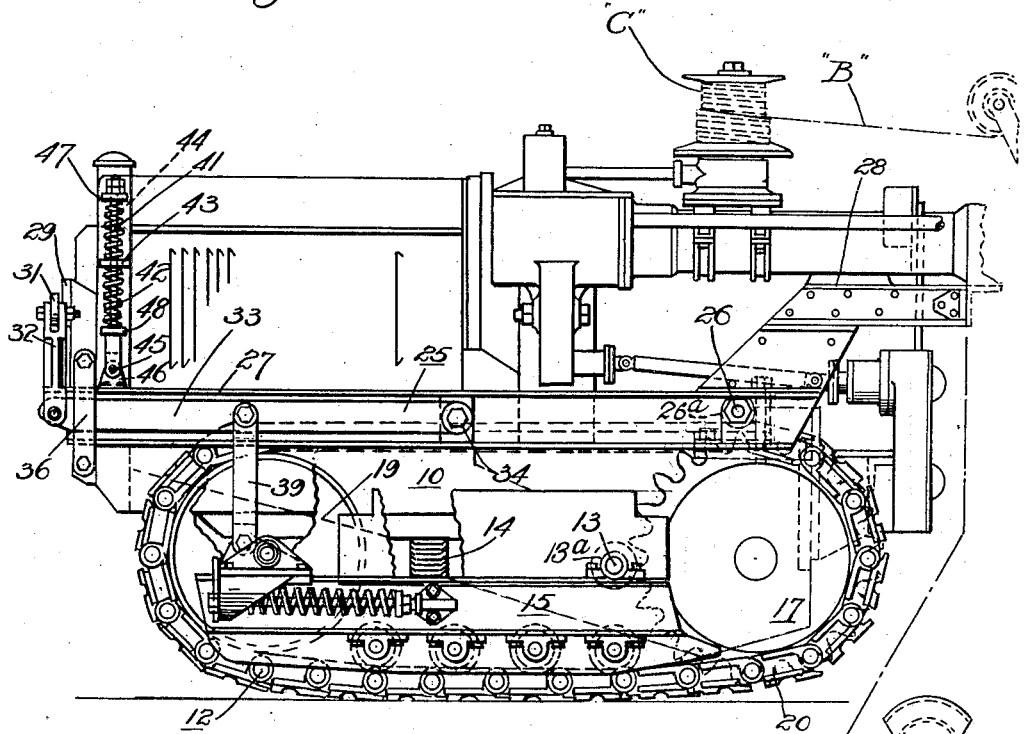
Figure 1 is a side elevation of a vehicle embodying the present invention; parts being broken away to show details of construction.

The vehicle illustrated in the drawings includes a chassis, 10, carrying the usual power plant encased in the housing, 11, and all supported on a pair of transversely spaced driving crawler units, 12. These crawler units are pivotally connected to the vehicle chassis adjacent their rear ends, with the forward or opposite ends of said crawler units "floating" with respect to the chassis. The "floating" ends of the crawler units support the front end of the vehicle chassis through the medium of a transversely extending leaf spring, 14, disposed beneath and secured to said chassis; the ends of said springs resting upon, but not positively engaged with a pair of closely spaced longitudinally extending structural supporting members, 15, of each of the respective crawler units. Said pivotal connection includes a transverse shaft, 13, carried adjacent the under side of the chassis, 10, with its ends journaled in bearings, 13ª, secured on the top of the supporting members, 15, of the crawlers, 12; this connection also serves to support the rear end of the chassis on said crawlers. It may be understood that the vehicle is provided with means concentric with the pivotal connection, 13, for driving the rear driving wheels, 17, of the crawlers in any conventional manner. The "floating" ends of the units are provided with idler wheels, 19, and trained around the respective pairs of driving and idler wheels of each crawler unit is a flexible track belt, 20, for engaging the road surface.

Ordinarily, when vehicles of this character are employed for straight horizontal draft work, the problem to which the present invention is directed does not present itself, since the vehicle is so constructed as to be substantially balanced at all times against the normal horizontal draft stresses, and the pivotal connection between the crawler units and the chassis permits of a floating action at the ends of the crawlers for accommodating road bed irregularities.

A supplemental or supporting frame structure, indicated generally at 25, is of rectangular outline, as may be seen in Figure 3 of the drawings, and completely surrounds the vehicle chassis. This frame is normally disposed in a substantially horizontal relation, and is pivotally connected to the chassis at a horizontal transverse axis adjacent the rear end of the vehicle chassis, above the crawler pivots, 13. This pivotal connection includes a transverse rock shaft, 26, fixedly mounted adjacent the rear end of the frame, 25, and journaled adjacent its ends in bearings, 26ª, on the chassis, 10, as seen in Figure 5 of the drawings. The supporting frame includes a pair of longitudinally extending side members, 27, which, as may be seen in Figure 1 of the drawings extend for a distance rearwardly beyond the pivot, 26, and are rigidly connected to a vertically offset platform structure, 28, which is adapted for supporting mechanism which, as shown, is in the nature of a combination derrick and earth boring device, as indicated generally at "A". As illustrated, the derrick includes a power operated draft cable, "B", associated with a winding drum, "C", which is connected to the power plant or other power source for lifting material. Because of such an arrangement, that is, the location of the derrick rearward of the pivot shafts, 13 and 26, it is essential to provide proper balance of the load being lifted by the derrick, and for this purpose a positive connection is provided between the front end of the chassis, the frame, 25, and the "floating" ends of the crawler units, so as to employ the weight of the crawler units as ballast for counteracting the downward stresses acting on the rear extension of the frame, 25; thus enabling said extension to carry greater loads, for example, to permit the derrick to lift greater weights.

Figure 2:
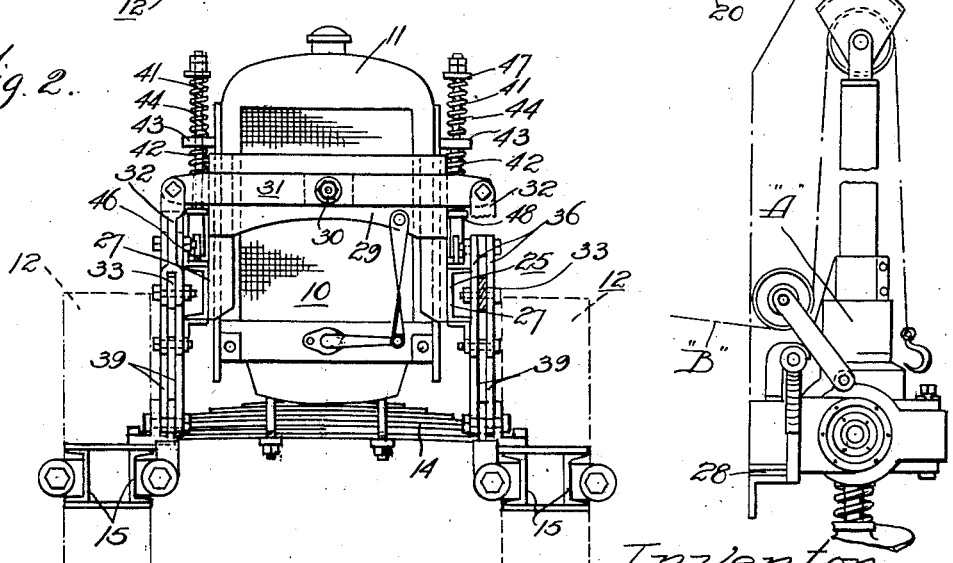
Figure 2 is a front elevation showing the crawler units indicated in dotted outline.

For this purpose the forward ends of the side members, 27, are rigidly secured together by a transverse tie member, 29, centrally of which is pivotally connected about a horizontal longitudinal axis, 30, a transversely disposed compensating beam, 31, which is vertically offset a substantial distance above the side members, 27, as seen in Figure 2. Pivotally connected to the outer ends of said beam are a pair of substantially vertically disposed connecting links, 32, whose lower ends are pivotally connected to the outer ends of a pair of side links, 33, which are disposed substantially within the vertical limits of the side members, 27, and are pivotally connected thereto at 34 at a point adjacent the middle of the length of said side members. The links 32, as may be seen in the drawings, serve as knuckle connections between the side links, 33, and the compensating beam, since the movements of the beam and the links are substantially perpendicular to each other. The side links, 33, are guided in their vertical movement about their pivots, 34, by a pair of spaced bars, 36, which are rigidly secured to the side members, 27, of the supporting frame.

These side links, 33, are positively connected to the "floating" ends of the respective crawler units by vertically disposed thrust links, 39, the ends of which are pivotally connected to the respective elements so as to compensate for some slight longitudinal movement relative to each other. Thus, when one of the crawler units traverses a rise on the road bed, as indicated at "D" in Figure 4, the frame structure, 15, of the crawler element imparts a force through the thrust member, 39, in an upward direction, swinging the corresponding side link, 33, upwardly about its pivot, 34, and by reason of its connection to the link, 32, forces the adjacent end of the compensating beam, 31, upwardly also. By virtue of this action the vehicle chassis remains in substantially the same relation to the other crawler unit, and it is not caused to rise any appreciable amount along with the crawler unit that is traversing the rise in the road bed. To insure proper action of the elements and to thus avoid raising the chassis when one of the crawler treads traverses a rise in the road bed, it will be understood that the transverse spring, 14, must be sufficiently flexible so as not to act as a lever to raise the chassis when one end of the spring is forced to rise with the rising crawler unit.

In order to cushion the shocks and impact of the chassis, by its movement relative to the crawler units, and to check the rebound due to the action of the spring, 14, I provide a pair of coil springs, 41 and 42, at opposite sides of the front end of the chassis, arranged one above and one below fixed lugs, 43, on said chassis. Each pair of springs is mounted on a rod, 44, whose lower end is pivoted at 45 to a bracket, 46, carried on the side frame members, 27, and the rod is provided with adjustable stop shoulders, 47 and 48, arranged for engaging the opposite ends of the respective springs. It will now be apparent that by reason of this construction the pair of upper springs, 41, on opposite sides of the chassis power plant will assist the leaf spring, 14, for yieldingly supporting the chassis on the crawler units, while the pair of lower coil springs, 42, act more or less as snubbers for counteracting and absorbing rebound or movement of the chassis in an upward direction with respect to the supporting frame structure, 25. It will be apparent that severe shocks which are frequently imparted to the chassis by reason of the rebound action, are substantially eliminated, so that the vehicle will ride smoothly and on a comparatively "even keel".

I claim:—

1. In combination with a vehicle chassis, a pair of transversely spaced crawler units pivotally connected adjacent one end to said chassis, spring means located at a distance from said pivot for yieldingly supporting the other end of the chassis on the crawler units, a supporting frame pivotally connected to the chassis above said pivot of the crawlers, and having a rearward extension beyond said pivots, and means for connecting the other end of said frame to the crawler units at the end remote from their pivot connection to the chassis.

2. In the combination defined in claim 1, said means being directly connected to the crawler units so as to permit employing the same as ballast for counteracting relatively great downward stresses on said extension of the frame.

3. In combination with a vehicle chassis, a pair of transversely spaced crawler units pivotally connected adjacent one end to said chassis, spring means located at a distance from said pivot for yieldingly supporting the other end of the chassis on the crawler units, a supporting frame pivotally connected to the chassis at the end adjacent the pivot to the crawlers, said frame including a pair of longitudinally extending side members, and a tie connecting said members at the end remote from the pivot, a pair of links pivoted at one end to said side members, a transversely disposed beam pivoted to said tie of the frame, means pivotally connected to the other ends of said links and the end of said beam, and means directly connecting said links to the adjacent crawler units.

4. In the construction defined in claim 3, said last mentioned means being pivotally connected to said crawler units and links to accommodate said supporting frame to the crawler units.

5. In the construction defined in claim 3, means carried on the side members of the frame for guiding said links throughout their range of swinging movement.

6. In combination with a vehicle chassis, a pair of transversely spaced crawler units pivotally connected adjacent one end to said chassis, spring means located at a distance from said pivot for yieldingly supporting the other end of the chassis on the crawler units, a supporting frame pivotally connected to the chassis at the end adjacent the pivot to the crawler units, said frame including a pair of longitudinally extending side members having portions extending rearwardly of said pivot, and a tie member connecting the opposite ends of said side members, said extensions being arranged to support a load which may tend to swing the forward end of the frame upwardly about its pivot, a pair of side links pivotally connected at one end to said side members about horizontal axes, a transversely disposed beam pivotally connected adjacent its middle to the tie member for swinging about a horizontal longitudinal axis, floating links having their ends pivotally connected respectively to the ends of said links and to the ends of said beams, and members directly connecting said side links intermediate their ends to the adjacent crawler unit, whereby said crawler units serve as ballast for counteracting the tendency of the forward end of the frame to swing upwardly about its pivot.

7. In combination with a vehicle chassis, a pair of transversely spaced crawler units pivotally connected adjacent one end to said chassis, spring means located at a distance from said pivot and arranged for yieldingly supporting the other end of the chassis on the crawler units, a supporting frame pivotally connected to the chassis adjacent the pivot of the crawlers, means positively connecting the end of the frame to the crawler units at the end remote from the respective pivots, and independent means providing a flexible connection between said remote end of the frame and the chassis.

8. In combination with a vehicle chassis, a pair of transversely spaced crawler units pivotally connected adjacent one end to said chassis, spring means located at a distance from said pivot and arranged for yieldingly supporting the other end of the chassis on the crawler units, a supporting frame pivotally connected to the chassis adjacent the pivot of the crawlers, means positively connecting the end of the frame to the crawler units at the end remote from the respective pivots, and additional spring means interposed between the frame at the end remote from its pivot, and the chassis, adapted for cushioning vertical movement of one of the parts relative to the other.

9. In combination with a vehicle chassis, a pair of transversely spaced crawler units pivotally connected adjacent one end to said chassis, spring means located at a distance from said pivot and arranged for yieldingly supporting the other end of the chassis on the crawler units, a supporting frame pivotally connected to the chassis adjacent the pivot of the crawlers, means positively connecting the end of the frame to the crawler units at the end remote from the respective pivots, and means providing a flexible connection between said remote end of the frame and the chassis, said means including a vertically disposed rod pivotally connected to one of said elements, and a pair of oppositely reacting coil springs carried on said rod and reacting against a fixed stop on the other of said elements.

10. In combination with a vehicle chassis, a pair of transversely spaced crawler units pivotally connected adjacent one end to said chassis, spring means located at a distance from said pivot and arranged for yieldingly supporting the other end of the chassis on the crawler units, a supporting frame pivotally connected to the chassis adjacent the pivot of the crawlers, means positively connecting the end of the frame to the crawler units at the end remote from the respective pivots, and means providing a flexible connection between said remote end of the frame and the chassis, said means including a vertically extending rod pivoted at its lower end to said frame, a pair of oppositely reacting coil springs carried on said rod and a fixed stop on the chassis interposed between said springs.

11. In combination with a vehicle chassis, a pair of transversely spaced crawler units pivotally connected adjacent one end to said chassis, a supporting frame including a pair of longitudinally extending side members pivotally connected to the chassis about a transverse axis; means positively connecting the side members of the frame to the crawler units at the end remote from their pivot connection to the chassis, and spring means located at a distance from said pivot connection of the chassis and crawler units and arranged for yieldingly supporting the free end of the chassis on the crawler units independently of the supporting frame.

12. In combination with a vehicle chassis, a pair of transversely spaced crawler units pivotally connected adjacent one end to said chassis, a supporting frame including a pair of longitudinally extending side members pivotally connected to the chassis about a transverse axis; means directly connecting the side members of the frame to the crawler units at the end remote from their respective pivot connections and arranged for permitting a limited range of vertical movement of one crawler unit relative to the other for accommodating roadbed irregularities, and spring means located at a distance from said pivotal connection of the chassis and crawler units and arranged for yieldingly supporting the other end of the chassis on the crawler units independently of the supporting frame.

In testimony whereof, I have hereunto set my hand at Edgerton, Wis., this 9th day of July, 1930.

NICHOLAI M. ERDAHL.